United States Patent [19]
Sweatt

[11] Patent Number: 5,729,365
[45] Date of Patent: Mar. 17, 1998

[54] COMPUTER GENERATED HOLOGRAPHIC MICROTAGS

[75] Inventor: William C. Sweatt, Albuquerque, N. Mex.

[73] Assignee: Sandia Corporation, Albuquerque, N. Mex.

[21] Appl. No.: 583,889

[22] Filed: Jan. 11, 1996

[51] Int. Cl.[6] .............................. G03H 1/00; G02B 5/18
[52] U.S. Cl. ...................... 359/2; 359/25; 359/571; 359/572; 235/457; 283/86; 380/3
[58] Field of Search .................... 359/2, 3, 9, 25, 359/569, 571, 572, 573, 575; 250/271; 356/71; 235/457; 283/86; 380/3, 54

[56] References Cited

U.S. PATENT DOCUMENTS

| | | | |
|---|---|---|---|
| 3,580,657 | 5/1971 | Sheridon | 359/3 |
| 5,291,006 | 3/1994 | Nishiguma et al. | 235/457 |
| 5,291,317 | 3/1994 | Newswanger | 359/572 |
| 5,621,515 | 4/1997 | Hashino et al. | 235/457 |
| 5,629,070 | 5/1997 | Korth | 359/2 |

*Primary Examiner*—Paul M. Dzierzynski
*Assistant Examiner*—Darren E. Schuberg
*Attorney, Agent, or Firm*—Timothy D. Stanley

[57] ABSTRACT

A microlithographic tag comprising an array of individual computer generated holographic patches having feature sizes between 250 and 75 nanometers. The tag is a composite hologram made up of the individual holographic patches and contains identifying information when read out with a laser of the proper wavelength and at the proper angles of probing and reading. The patches are fabricated in a steep angle Littrow readout geometry to maximize returns in the −1 diffracted order. The tags are useful as anti-counterfeiting markers because of the extreme difficulty in reproducing them.

21 Claims, 3 Drawing Sheets

COMPUTER GENERATED HOLOGRAPHIC MICROTAGS

This invention was made with Government support under Contract No. DE-AC04-94AL85000 awarded by the U.S. Department of Energy. The Government has certain rights in this invention.

BACKGROUND OF THE INVENTION

This invention relates to holograms. More particularly it relates to microscopic computer generated holographic markers or microtags. Still more particularly it relates to such microtags fabricated at such dimensions and feature sizes so as to be non-reproducible for practical purposes.

Although this invention has a variety of uses, it will find a primary application as an anti-counterfeiting device for applications such as identification cards, credit cards, high value microchips, negotiable instruments and currency. Legitimate producers of these and other high value items have been at war with counterfeiters for a long, long time. Each advance by the legitimate producer is fairly quickly matched by the counterfeiter/forger. Recent advances in color photocopying technology require a new level of anti-counterfeiting techniques with respect to currency and negotiable instruments. ID cards have relied mostly on magnetic coding heretofore; however, these technologies are also at risk from sophisticated forgers. One solution is found in U.S. Pat. No. 4,641,017 to H. Lopata for a fraud resistant credit card system that incorporates a reflection hologram as well as magnetic coding. The card is read through a combination magnetic reader and a laser reader oriented at a precise angle to the card, with one or more reflective images from the hologram being read at another precise angle. However, this type of hologram is not particularly difficult to reproduce. There is an unmet need for a tag that can be incorporated into an item such as an ID card, credit card, currency or the like which has a unique identifying response to light and which is impossible to reproduce for practical purposes.

SUMMARY OF THE INVENTION

This invention utilizes recent advances in extreme ultraviolet microlithography to produce microscopic computer generated holograms made up of a grid of individual steeply blazed elements having extremely small feature sizes. This microtag has several advantages over the prior art. The microtag itself can be made to be the size of a grain of dust and therefor imperceptible to the unaided eye. The feature sizes of the gratings used herein can be produced in quantity only by a very few extreme UV microlithography machines now in existence. These machines are prohibitively expensive, and it would be irrational to build one for counterfeiting purposes. The configuration of the gratings of the individual elements can only be ascertained with an atomic force microscope, and the time required to do so becomes prohibitive with increased numbers of elements on the microtag. Optionally, the gratings may be covered by a coating that is transparent to the wavelengths used to read the microtags, thus largely preventing use of the atomic force microscope for hostile analysis of the gratings. The microtags can be made to be responsive only to deep blue or UV light where the human eye is unresponsive. The individual microtags can also be combined together to produce a much larger 'macrotag' having so much information content in the various individual microtags as to be functionally indecipherable.

DETAILED DESCRIPTION OF THE INVENTION

The microtag concept has been developed for security purposes. These tags will be able to be mass-produced using the extreme-UV lithography (EUVL) tool now being developed. Using any other fabrication method these tags would be prohibitively expensive to counterfeit; hence these tags could be used to thwart the forging of microchips, memories, currency, ID cards and credit cards. When used in conjunction with a microelectronic device, the microtags can be made part of the device itself rather than attached separately.

Figure 1:
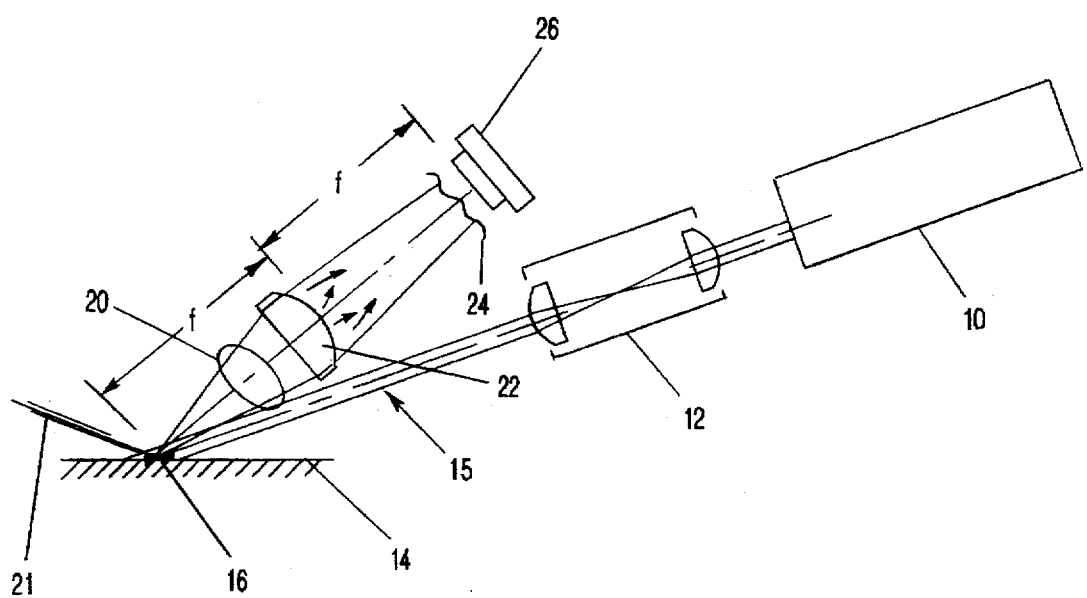
FIG. 1 is a schematic diagram of an apparatus for reading the microtag.

Microtags are defined as microscopic, computer-generated holograms (µCGH's). They are designed so they can be "read out" when illuminated with a blue or other suitable wavelength) laser 10 in a Littrow Geometry as shown in FIG. 1. The beam is preferably conducted through beam expander and spatial filter optics 12 after leaving the laser 10. The beam 15 then illuminates the microtag 16. Some of the beam energy is diffracted 20 back into the collection optics, and the remainder is mostly reflected 21 off the microtag 16 and surrounding area. When the microtag 16 is located at the front focal point of a read-out lens 22, then the image 24, which is the tag's Fourier transform, will appear at the lens' back focal point. This image, made up of the phase and amplitude variations created by the microtag, can be viewed by eye or with a CCD TV 26 or other suitable detector.

Figure 2:
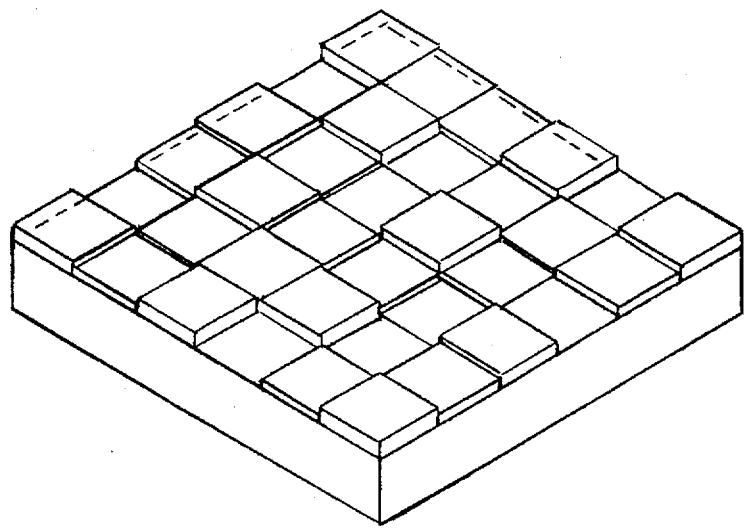
FIG. 2 is an isometric view of a prior art computer generated hologram that does not employ phase gratings on the individual elements.
Figure 3:
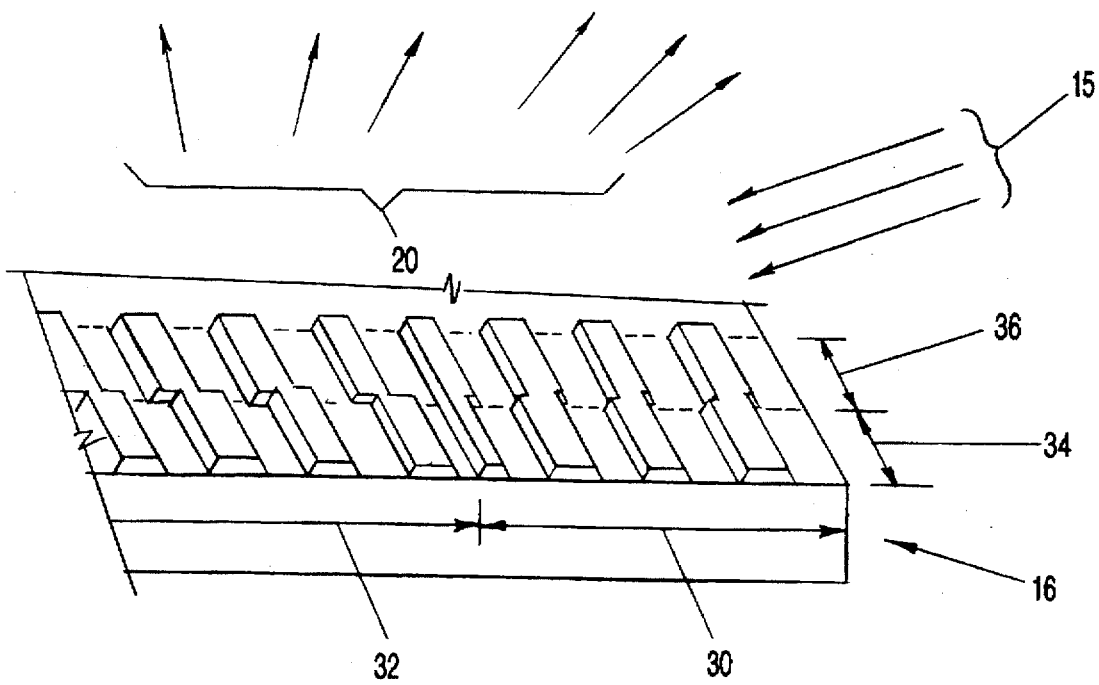
FIG. 3 is an isometric view of a portion of a phase-only computer generated hologram grid of the present invention showing how the gratings are shifted between elements.

Simple images such as letters, numbers, and binary codes (~24 bit) can be encoded in a CGH consisting of 8×8 array of constant-phase patches. These constant-phase patches are linear gratings that diffract the probe beam 15 back in the general direction of the source. The patches are arranged in rows 30, 32 and columns 34, 36 in the portion shown in FIG. 3. FIG. 3 shows a partial cross-section of a composite grating which could be formed in photoresist and then overcoated with aluminum. It is clear from this sketch that most of the power in the diffracted beam 20 is returned back in the general direction of the source from the sides of the features. There is an arbitrary phase difference between the various facets. These phase differences are the variables with which the image (in the Fourier transform space) is designed. As will be explained in more detail below, amplitude information may also be incorporated into the hologram. This can be compared to a prior art reflective or transmissive computer generated hologram shown in FIG. 2 that does not employ diffraction or amplitude modulation.

Figure 4A:
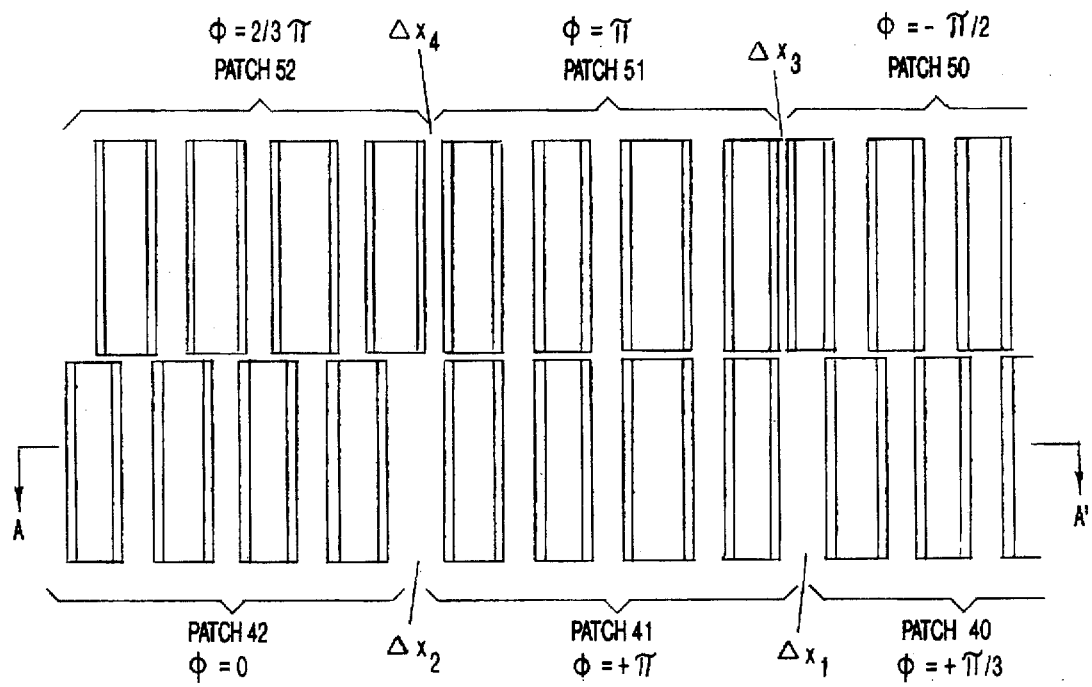
FIG. 4A is a plan view of a portion of a microtag.
Figure 4B:
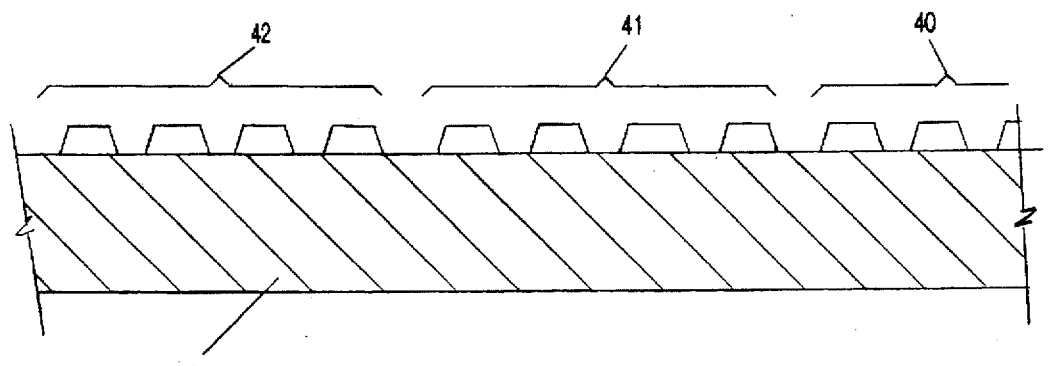
FIG. 4B is a sectional view of the microtag of FIG. 4A taken along section A–A'.

FIGS. 4A and 4B show the geometry of a 2×3 subarray of a larger array in more detail. The various constant phase patches 40, 41, 42, 50, 51, and 52 have the different phases shown in the figure. The phase differences between patches are produced by laterally displacing the various patches with respect to the probe beam by the respective distances $\Delta x_1$, $\Delta x_2$, $\Delta x_3$, and $\Delta x_4$ as shown in FIG. 4A. FIG. 4B shows the three patches 40, 41 and 42 in cross-section atop the substrate 14.

The rather unusual Littrow geometry and the short wavelength were chosen because the combination requires the extremely small feature size. If the incoming and diffracted beams are both about 60° from the normal and the wavelength is 440 nm (HeCd laser), then the lines and spaces in the µCGH must be about 130 nm wide. These small features cannot be resolved with visible light in a near-normal viewing geometry. This has two important implications: first, it makes the tag very difficult to find on a diffuse surface—thus they should be easy to hide. Second, the only tool with which one can determine what is written on the tag is an atomic-force microscope. These are significant impediments for a would-be forger, but tag duplication is the major one. The small feature sizes can be printed with extreme-UV lithography tools which are available only at a few major research facilities and will remain so for 10–20 years. The only other way to write one of these tags is line by line with an electron-beam writer. This would be very slow and expensive. Even this can be prevented if the legitimate microtag gratings are covered by a smooth transparent coating because the electron beam writer would need to have the geometric configuration of the gratings. The transparent coating should prevent the use of an atomic force microscope to obtain this information. The fact that the tags can be forged albeit with great difficulty, leads one to another question.

How should these tags be used—should one hide them or flaunt them? A simple tag with an 8×8 array of phase patches might be 40 microns wide and 80 microns long, which is the size of a piece of dust. Therefore, the enemy's first problem is to locate it. The second problem is to read it. In order to read a tag, it must be illuminated from the correct angle and azimuth, and finally, it must be in focus to be identifiable.

Another way to use this concept is to print a large tag, e.g. 2×2 mm, that has hundreds of individual micro-holograms on it. The holograms should all have different orientations and they can have slightly different line widths (120 nm, 130 nm, 140 nm . . . ) so the diffraction angles (elevation angles) also differ. Finally, the microtags' positions in the array can be part of the code.

With multiple µCGH's; one could spell out words or have hundreds of unrelated binary codes. This "flaunt them" scheme may be safer than to hide them because insider information does the forger little good. The forger will still have to decode and then write a daunting amount of data. The question for the potential user of mega-microtags is, "Can the enemy afford to read and understand such a tag, and then copy one on every forgery made?".

In the succeeding sections, the following topics will be addressed: the design of the tags, the extreme-UV lithography printing tool, the tag-reading system, and our experimental program.

A prototype system including the microtag geometry, test patterns, and the readout system all had to be conceived together so the concept could be tested. The goal of this program was to develop a microscopic-difficult-to-forge tag that could be mass-produced with an extreme-UV lithography (EUVL) tool. The computer-generated hologram concept, the blue laser for readout, and the Littrow readout geometry evolved by considering the competing needs to: 1.) Keep the features smaller than the 250 nm print size available with present holography tools and larger than 75 nm, which EUVL will be capable of; 2.) The tag should be difficult to find, and 3.) The readout should be easy.

From this beginning the prototype requirements became apparent. For example, alphanumeric characters seemed to be adequate test images; and an 8×8 CGH should have roughly the minimum number of variables needed to create them.

The readout system itself ought to be designed so it is easy to build from off-the-shelf components—from such a beginning it can naturally evolve into a low cost tool. This implies the use of a standard CCD, off-the-shelf lenses, and simple fixturing. The simplest, readily obtainable optics capable of diffraction-limited imaging are doublets of modest speed, e.g. F/4. If one chooses F/4, then to first order this defines the minimum size that the facets in the microtag can have. The width should be $W_{pixel} \geq 4.3$ µm. If the Littrow angle is about 60°, then the length should be about twice this. The pixel size was chosen to be 5 µm by 10 µm, so the whole microhologram is 40 µm by 80 µm—size of a speck of dust. FIG. 1 shows one possible read out system.

Each facet is a 5 µm aperture which has a diffraction angle of 1.18 radians. The most widely separated patches in our 8×8 array are 35-µm apart so the smallest angular resolution needed will be 0.012 radians. If we choose a 25-mm focal length readout lens, the image will be 4.5 mm across which will fit comfortably on a 6.6-mm×8.8-mm CCD. This will also give ample resolution.

Sandia National Laboratories and AT&T have built an experimental extreme-UV lithography system at Sandia's Livermore, California facility. This system uses a laser-plasma source of 13.4-nm radiation for illumination. The all-reflective camera using Si-Mo multilayer coatings images a reflective mask onto the wafer with a reduction of 10:1. It can faithfully produce images containing 100-nm features. This Schwartzchild type camera has a 400-µm image field with very good image quality and low distortion which allows us to make our 50-µm×100-µm tags. Several photoresists are available including PMMA. The design and operating characteristics of this system are in the open literature. One example of which is found in the Tichenor, D. A. et al. reference "10x Reduction imaging at 13.4 nm," in *OSA Proceedings on Extreme Ultraviolet Lithography*, eds. F. Zernike and D. T. Attwood, pp. 89–97. This reference is part of a proceedings volume (vol. 23) which sets forth the information revealed at an Optical Society of America meeting in Monterey, California in September, 1994 on extreme ultraviolet lithography.

A next-generation, large field of view system is being prototyped. Its ring-field camera is designed to have a 25-mm-long field that is scanned perpendicular to this length allowing 25-mm×25-mm microchips to be exposed. This is large enough to expose a hundred groups, each containing hundreds of tags.

The Gerchberg-Saxton method is employed to design the holograms. This technique is well known and is in the open literature. The applicable reference is Gerchberg, R. W. "Super-resolution through error energy reduction," *Optica Acta*, 21, No. 9, pp. 709–720 (1974).

The basic design of all microtags for all applications is the same up to the printing step. The printing procedure may vary depending on the specific application.

The first step would be to choose the image to be coded into the microtag. The amount of information in the image will roughly dictate the size of the microtag. For example, a complex image with quite a bit of free detail like the American eagle might require a 16×16 array with both amplitude and phase information in the gratings or 32×32 array with phase-only patches. Another image that might be desired is a single alphanumeric character that might require only a 6×6 amplitude and phase hologram.

Next the Gerchburg-Saxton method is used to determine a hologram that would produce the desired image. This algorithm iterates back and forth between the hologram space. In image space it matches the intensity pattern produced by the hologram with the desired image. In hologram space it adjusts the phase of each patch, and for a phase-only hologram, it forces the intensity to be unity. If the amplitude is allowed to vary, it forces the intensity to be between zero and one.

The calculated phase information dictates the phase of the grating patch as shown in FIG. 3. The amplitude can be reduced by removing some of the bars in a patch or shortening their lengths. It is also possible to attenuate the diffraction efficiency.

The calculation of the size and the shape of the patches and bars within the patches will depend upon the read-out wavelength and optics. The blaze angle of the sloping sides of the bars in an array is preferentially optimized to maximize the return into the −1 diffracted order. In fact, the EUV source has a sloped intensity profile rather than an abrupt on/abrupt off transition as is more commonly desired in normal microlithography processes. The PMMA photoresist is also desirable for use herein because it has a sloped response to exposure. The combination of the two allows the exposure profile of the photoresist to be tailored to produce a smooth side wall angle on the side of a grating element at the optimized blaze angle. This tailoring is within the skill in the art. Although this embodiment has sloped side walls oriented at the blaze angle to diffract energy back towards the detector, it is also possible to retro-diffract the probe beam back to the detector with ordinary scribed gratings with vertical side walls on the patches, although with some decrease in efficiency.

Also the presence of a transparent coating on top of the gratings will serve to decrease the apparent spacing of the bars to the read-out system. Other variations could include varying the spacing between the bars in a patch in a smooth varying function, that is smooth phase variation perpendicular to the length of the bars. One could also introduce smooth curvatures into the otherwise straight bars to induce phase variation that varies smoothly in the direction parallel to the length of the bars.

The extreme UV laser (EUVL) system will have a magnification which will dictate how large the mask should be. This mask will be written on a mirror or micron-thick sheet of silicon using an electron beam writer.

As mentioned above, the specific application will dictate the fabrication (writing) procedure. The easiest application is the marking of microelectronic chips. If one is utilizing an EUVL step to make some very small features on the chip for other purposes, the creation of a microtag on the same chip becomes simple.

For applications where the microtag will not share the same substrate (currency, ID cards, etc.), one could use the following process. Starting with a sacrificial substrate, one would then deposit a release layer on top of that, followed by deposition of a several micron thick tag substrate, and finally a layer of photoresist. A large number of microtags would then be printed in the photoresist by exposure to the EUVL system and subsequent etching. The release layer could then be dissolved, yielding the thin microtags. The bars in the gratings in the developed photoresist could be coated with a thin layer of aluminum for durability and increased reflectivity. The tags can also be coated with a transparent compound to present a planar surface of the top of the microtag to thwart unauthorized examination of the bar geometry by an atomic force microscope. The individual microtags or the larger combinations thereof are then attached to the item. For plastic cards, the could be glued or heat bonded to the cards; for currency or other paper instruments, the microtags could be bonded to thin plastic strips that would be incorporated into the paper. The finished microtag is the array of the various individual elements or patches of 130-micron wide bars of photoresist on the substrate. There are other alternative ways to make the microtags.

The above detailed description has concentrated upon a particular prototype embodiment using a HeCd laser radiating at about 440 nm to read the microtag. Other lasers operating at different wavelengths can be employed as can different grating spacings. Amplitude modulation can also be employed in conjunction with the phase gratings in the following fashion. Maximum returns to the CCD or the eye or other suitable detector can be achieved by extending the lengths of the gratings to the full width of an individual grating element. Lesser amplitudes can be created by decreasing the lengths. Combining phase and amplitude modulation into the microtag increases the accuracy of the readout at the expense of received signal strength at the CCD.

These and other modifications are possible, and the invention should not be limited the specific embodiments discussed above. The true scope of the invention is to be found in the appended claims.

I claim:

1. A microtag for placement on an object comprising a microscopic computer generated hologram comprising an array of individual phase grating patches in a diffractive Littrow readout geometry with feature spacings between the individual diffractive elements in the patches in the array being a value of between about 250 nanometers and about 75 nanometers.

2. The microtag of claim 1 wherein the individual phase grating patches are also amplitude gratings.

3. The microtag of claim 1 wherein the hologram comprises a means to produce an identifying image when illuminated with laser light suitably correlated with the feature spacing.

4. The microtag of claim 3 wherein the laser light is at a wavelength at which the human eye does not respond effectively.

5. The microtag of claim 4 wherein the laser light is produced by a HeCd laser at about 440 nanometers wavelength.

6. The microtag of claim 3 wherein the Littrow readout geometry is a steeply blazed grating having a blaze angle such that the laser light is preferentially returned back from the grating towards the laser light source.

7. The microtag of claim 6 wherein the blaze angle is optimized to maximize diffraction into the −1 diffracted order.

8. The microtag of claim 7 wherein the blaze angle is realized as smoothly sloped side walls of the grating features facing the source.

9. The microtag of claim 1 combined with similar microtags on the same substrate to form an array of a multiplicity of individual microtags.

10. The multiplicity of microtags of claim 9 wherein at least two of the individual microtags have different feature spacings.

11. The microtag of claim 1 wherein the length of at least one of the individual diffractive elements in a patch is different from the other elements in that patch.

12. The microtag of claim 1 wherein at least one of the individual diffractive elements in a patch that would otherwise be present in a complete patch is removed.

13. The microtag of claim 1 wherein the feature spacings are a fixed value.

14. The microtag of claim 1 wherein the feature spacings vary smoothly across a patch.

15. The microtag of claim 1 wherein the features are linear.

16. The microtag of claim 1 wherein the features within an array are smooth curved and substantially parallel.

17. The microtag of claim 1 further comprising a clear coating covering the patches and presenting a smooth upper surface.

18. A microtag for placement on an object comprising a microscopic computer generated hologram comprising an array of individual phase grating patches in a diffractive Littrow readout geometry optimized to return light from the microtag in the −1 diffracted order with feature spacings between the individual linear diffractive elements in the patches in the array being a fixed value of between about 250 nanometers and about 75 nanometers.

19. The microtag of claim 18 wherein the length of at least one of the individual diffractive elements in a patch is different from the other elements in that patch.

20. The microtag of claim 18 wherein at least one of the individual diffractive elements in a patch that would otherwise be present in a complete patch is removed.

21. The microtag of claim 18 wherein the hologram comprises a means to produce an identifying image when illuminated with laser light suitably correlated with the feature spacing.

* * * * *